US012748446B2

(12) United States Patent
Anagnostopoulos et al.

(10) Patent No.: US 12,748,446 B2
(45) Date of Patent: Sep. 29, 2026

(54) LOW-DROPOUT REGULATOR CIRCUIT AND ELECTRONIC DEVICE

(71) Applicant: u-blox AG, Thalwil (CH)

(72) Inventors: Dimitrios Anagnostopoulos, Maroussi (GR); Fani Liakou, Maroussi (GR); Samuel Blatter, Thalwil (CH); Thomas Christen, Thalwil (CH)

(73) Assignee: u-blox AG, Thalwil (CH)

( * ) Notice: Subject to any disclaimer, the term of this patent is extended or adjusted under 35 U.S.C. 154(b) by 294 days.

(21) Appl. No.: 18/417,643

(22) Filed: Jan. 19, 2024

(65) Prior Publication Data

US 2024/0255976 A1 Aug. 1, 2024

(30) Foreign Application Priority Data

Jan. 26, 2023 (EP) .................................... 23153379

(51) Int. Cl.
*G05F 1/575* (2006.01)
*G05F 1/46* (2006.01)
*G05F 3/26* (2006.01)

(52) U.S. Cl.
CPC .............. *G05F 1/575* (2013.01); *G05F 1/468* (2013.01); *G05F 3/262* (2013.01)

(58) Field of Classification Search
CPC ........... G05F 3/262; G05F 1/468; G05F 1/575
USPC .......................................................... 323/280
See application file for complete search history.

(56) References Cited

U.S. PATENT DOCUMENTS 7,928,706 B2 * 4/2011 Do Couto ............... G05F 1/575 323/273
8,797,008 B2 * 8/2014 Devegowda ............ G05F 1/573 323/278
10,338,618 B2 7/2019 Mayer et al.
2014/0139197 A1 * 5/2014 Price ......................... G05F 1/46 323/280
2017/0045901 A1 * 2/2017 Price ......................... G05F 1/56
2022/0181971 A1 * 6/2022 Mitev ....................... G05F 1/59
2022/0342434 A1 * 10/2022 Meng ...................... G05F 1/575

FOREIGN PATENT DOCUMENTS

EP 3084556 10/2018

OTHER PUBLICATIONS

Extended European Search Report in European Appln. No. 23153379.5, mailed on Jul. 7, 2023, 11 pages.

* cited by examiner

*Primary Examiner* — Yemane Mehari
(74) *Attorney, Agent, or Firm* — Fish & Richardson P.C.

(57) ABSTRACT

A low-dropout regulator circuit comprises a pass element (PE) between a supply terminal (VDD) and an output terminal (OUT) for providing an output voltage (vout). A control block (CB) is configured to control the pass element (PE) based on a difference between a feedback voltage (vfb) and a reference voltage (vref). The control block (CB) is configured to be selectively operated in a normal mode and in a low-supply mode depending on a selection signal (sel). In the normal mode the control block (CB) is configured to be operated with a first operating range (OR1), the first operating range (OR1) excluding a target output voltage, and in the low-supply mode the control block (CB) is configured to be operated with a second operating range (OR2), the second operating range (OR2) including the target output voltage and only partially overlapping with the first operating range (OR1).

15 Claims, 5 Drawing Sheets

LOW-DROPOUT REGULATOR CIRCUIT AND ELECTRONIC DEVICE

CROSS-REFERENCE TO RELATED APPLICATION(S)

This application claims priority to European Application No. 23153379.5, filed on Jan. 26, 2023, the contents of which are incorporated herein by reference in their entirety.

TECHNICAL FIELD

This disclosure relates to low-dropout regulators, LDO, circuits and to electronic devices that include such low-dropout regulator circuits.

BACKGROUND ART

Many integrated circuits require a specific circuit supply voltage, which is usually lower than the supply voltage provided to a device incorporating the integrated circuit. To this end voltage regulators are commonly provided in the device that generates the lower circuit supply voltage from the higher device supply voltage. For example, such a voltage regulator is provided as an on-chip voltage regulator.

In the case that there is already some power management available in the device or a corresponding application, it might be more power efficient to directly supply the integrated circuit with the lower circuit supply voltage.

To this end one could directly supply the integrated circuit with the lower circuit supply voltage, for example either by bypassing the voltage regulator, such that the voltage from the power management system is provided as the circuit supply voltage in an unregulated fashion, or by disabling the voltage regulator and supplying the circuit supply voltage directly at its output.

However, the downside of such approaches is that the integrated circuit can be damaged in the case of a wrong configuration in the bypass approach or with a supply voltage that is too high. Disabling the voltage regulator and supplying the supply voltage directly at its output requires a different hardware configuration.

SUMMARY OF INVENTION

An object to be achieved is to provide an improved supply concept that allows the provision of highly efficient regulated voltages basically independent of a level of a supply voltage.

This object is achieved with the subject-matter of the independent claims. Embodiments and developments derive from the dependent claims.

An LDO circuit usually is tuned to provide a predetermined target output voltage at its output by regulating the supply voltage received at its input via a pass element, e.g. a transistor. A control block is configured to control the pass element based on a difference between a feedback voltage and a reference voltage, which determines the target output voltage. The improved supply concept is based on the insight that the LDO circuit can be confronted with two operating conditions regarding its supply voltage, namely either a higher supply voltage that needs to be regulated down to the target output voltage or a supply voltage being exactly, or close to, the target output voltage such that no, or only very little, regulating is necessary. In order to deal with these two operating conditions, the control block according to the improved supply concept is configured to be selectively operated in a normal mode of operation and in a low-supply mode of operation, in particular depending on the level of the supply voltage.

If the level of the supply voltage is within a first operating range that excludes the target output voltage, the normal mode of operation can be chosen. On the other hand, if the supply voltage is within a second operating range that includes the target output voltage and only partially overlaps with the first operating range, the control block can be operated in the low-supply mode of operation. The selection of the mode of operation is performed via a selection signal, which may be determined by a voltage detector based on the received supply voltage, or selected by configuration, e.g. through a user.

For example, in a normal mode of operation, the LDO circuit and in particular the control block, is optimized to accurately control the output voltage by controlling the pass element. In the low-supply mode of operation, the characteristics of the control block are changed such that it can support very low input voltages, i.e. supply voltages close to or identical to the target output voltage. In the low-supply mode of operation, the accuracy of regulation may be reduced for higher input voltages.

An implementation of a low dropout regulator circuit according to the improved supply concept comprises a supply terminal for receiving the supply voltage, an output terminal for providing the output voltage, the pass element coupled between the supply terminal and the output terminal, and the control block. As detailed above, the control block is configured to control the pass element based on a difference between a feedback voltage, which is derived from the output voltage, and a reference voltage, which determines the target output voltage.

In the normal mode of operation, the control block is configured to be operated with a first operating range for the supply voltage, the first operating range excluding the target output voltage. In the low-supply mode of operation the control block is configured to be operated with the second operating range for the supply voltage. The second operating range includes the target output voltage and only partially overlaps with the first operating range.

The above implies that a lower limit of the first operating range is higher than a lower limit of the second operating range and, at the same time, an upper limit of the first operating range is higher than an upper limit of the second operating range.

With the two modes of operation, the characteristics of the regulation can be easily adjusted to the level of the supply voltage such that the control block can perform the kind of regulation that is optimal for the respective selected mode of operation. Furthermore, as a regulation is performed in both modes of operation, damage to a circuit connected to the output terminal can be prevented even if the low-supply mode of operation is selected for higher supply voltages.

For example, in the normal mode of operation the control block is configured to control a resistance of the pass element to match a desired voltage drop between the supply terminal and the output terminal. In the low-supply mode of operation the control block is e.g. configured to control the resistance of the pass element towards zero to achieve a minimum voltage drop between the supply terminal and the output terminal. For example, the minimum voltage drop is defined by the characteristics of the pass element and is therefore a physical limitation of the pass element. For example, in the normal mode of operation the control block assumes a minimum voltage drop along the pass element and has no specific measures to further minimize this voltage drop, which is also the case for conventional LDO circuits that do not have two such modes of operation.

If the supply voltage exceeds the second operating range the accuracy of regulation of the control block may be higher in the normal mode of operation than in the low-supply mode of operation.

In some implementations the target output voltage may be in the range of 0.9 V to 1.1 V, or even in the range of 0.6 V to 0.9 V, or generally spoken in the range of 0.6 V to 1.1 V. For example, the target output voltage is in the range of 0.65 V to 1.05 V. Depending on the target output voltage range, a lower limit of the first operating range is at least 0.1 V higher than the target output voltage. However, assuming the target output voltage in the ranges mentioned before, the supply voltage in the normal mode of operation may go up to 1.8 V or even 3.3 V.

The improved supply concept also provides an electronic device comprising a low dropout regulator circuit for supplying the electronic device with regulated voltages according to one of the implementations described in this disclosure. The electronic device may be at least one of a cellular communication device, a global navigation satellite system (GNSS) positioning device, a short-range radio frequency positioning device, e.g. using Bluetooth, or an ultra-wideband (UWB) and an Internet of Things (IoT) device. However, potential use of the LDO circuit is not intended to be limited by these examples.

BRIEF DESCRIPTION OF DRAWINGS

The improved supply concept will be explained in more detail in the following with the aid of the drawings. Elements and functional blocks having the same or similar function bear the same reference numerals throughout the drawings. Hence their description is not necessarily repeated in following drawings.

In the drawings.

DETAILED DESCRIPTION

Figure 1:
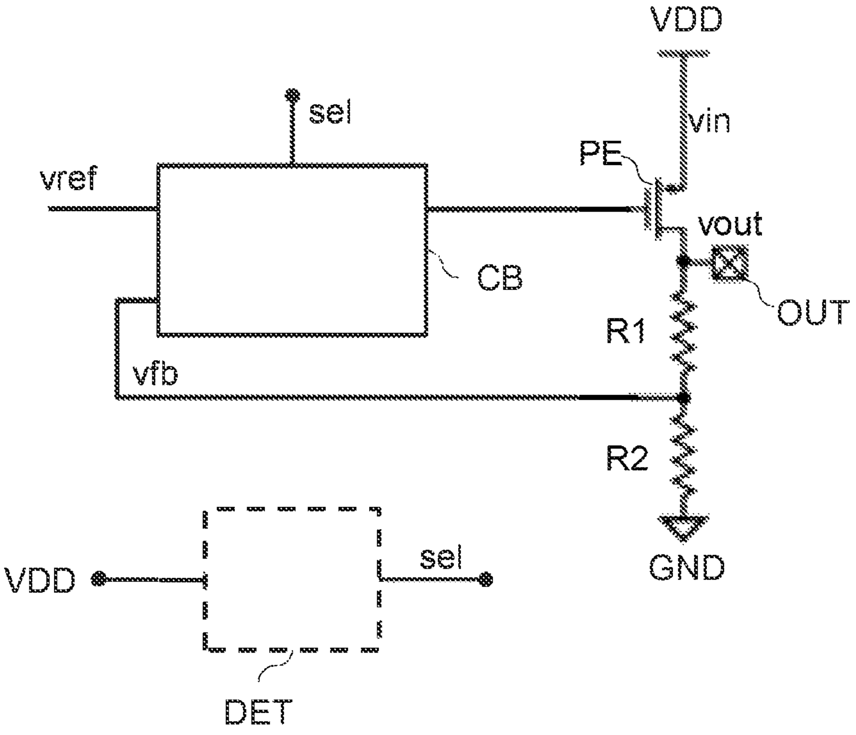
FIG. 1 shows a block diagram of an example implementation of a low-dropout regulator circuit.

FIG. 1 shows a block diagram of an example implementation of a low-dropout regulator circuit. The LDO circuit comprises a supply terminal VDD for receiving supply voltage vin, an output terminal OUT for providing an output voltage vout and a pass element PE coupled between the supply terminal VDD and the output terminal OUT. A first and a second resistance R1, R2 are connected between the output terminal OUT and a reference potential terminal GND as an example for a voltage divider, in this case a resistive voltage divider, for deriving a feedback voltage vfb from the output voltage vout. A control block CB is configured to control the pass element PE based on a difference between the feedback voltage vfb and a reference voltage vref, which determines a target output voltage. The pass element PE may be implemented as a field-effect transistor, FET, or more particularly as a P-FET, wherein the gate terminal of the FET acts as a control input of the pass element PE. The elements of the LDO circuit described so far in conjunction with FIG. 1 could also be found in a conventional LDO circuit.

Figure 2:
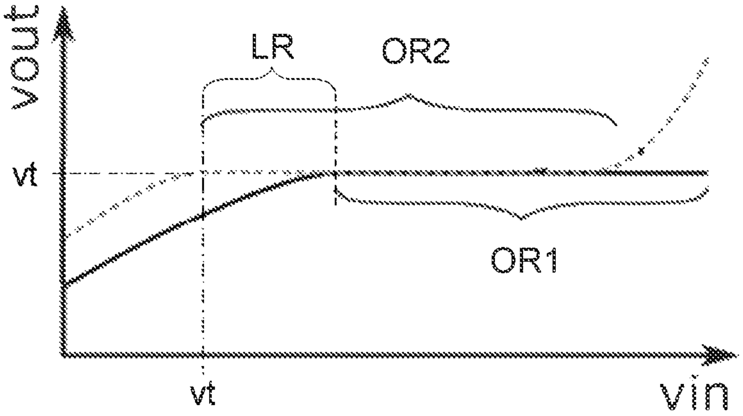
FIG. 2 shows an example diagram of operating ranges.

However, according to the improved supply concept, the control block CB is configured to be selectively operated in a normal mode of operation and in a low-supply mode of operation depending on a selection signal sel. Referring briefly to FIG. 2, in the normal mode of operation the control block CB is configured to be operated with a first operating range OR1 for the supply voltage vin, denoted by the respective curly bracket, wherein the first operating range OR1 excludes the target output voltage vt. The solid line in FIG. 2 shows the regulation characteristics of the control block for the normal mode of operation. It can be seen that only if the supply voltage vin is within the first operating range OR1 in the normal mode of operation a correct regulation of the output voltage vout is achieved such that the output voltage vout meets the target output voltage vt.

In the low-supply mode of operation, the control block CB is configured to be operated with a second operating range OR2 for the supply voltage vin, denoted by a further respective curly bracket. Here the second operating range OR2 includes the target output voltage vt, which is marked with a vertical dash-dotted line. For example, the target output voltage vt basically corresponds to the lower limit of the second operating range OR2. The regulation characteristic for the low-supply mode of operation is shown with a dashed line in FIG. 2. As can be seen, if the input voltage vin exceeds the upper limit of the second operating range OR2, the accuracy of regulation in the low-supply mode of operation can decrease. On the other hand, in the range LR between the lower limit of the second operating range OR2 and the lower limit of the first operating range OR1, the control block CB in the low-supply mode of operation controls the pass element PE such that the output voltage vout matches the target output voltage vt, while the output voltage vout is below the target output voltage vt in the normal mode of operation for the above mentioned range.

It can be further seen from FIG. 2 that the second operating range OR2 only partially overlaps with the first operating range OR1.

Referring back to FIG. 1, selecting whether to operate in the normal mode of operation or in the low-supply mode of operation is determined by the selection signal sel. For example, the selection signal sel can be generated with an optional voltage detector DET that, for example, evaluates the input voltage vin at the supply terminal VDD. However, the selection signal sel can also be provided via some kind of configuration, e.g. user configuration, e.g. if it is known whether the supply voltage better matches the first operating range OR1 or the second operating range OR2. In the normal mode of operation, similar to conventional LDO circuits, the control block may be configured to control the resistance of the pass element PE to match a desired voltage drop between the supply terminal VDD and the output terminal OUT. It should be apparent that the desired voltage drop results from the difference between the actual supply voltage vin and the target output voltage vout.

However, unlike conventional LDO circuits, in the low-supply mode of operation the control block is configured to control the resistance of the pass element towards zero to achieve a minimum voltage drop between the supply terminal VDD and the output terminal OUT. This is particularly relevant if the actual supply voltage vin corresponds or is close to the target output voltage, such that a voltage drop between the supply terminal VDD and the output terminal OUT needs to be minimized.

FIGS. 3 to 7 show block diagrams of various example implementations of LDO circuits that are based on the implementation shown in FIG. 1. Hence, only the details of the specific implementations will be described in the following. This in particular refers to the implementations of the control block CB.

Figure 3:
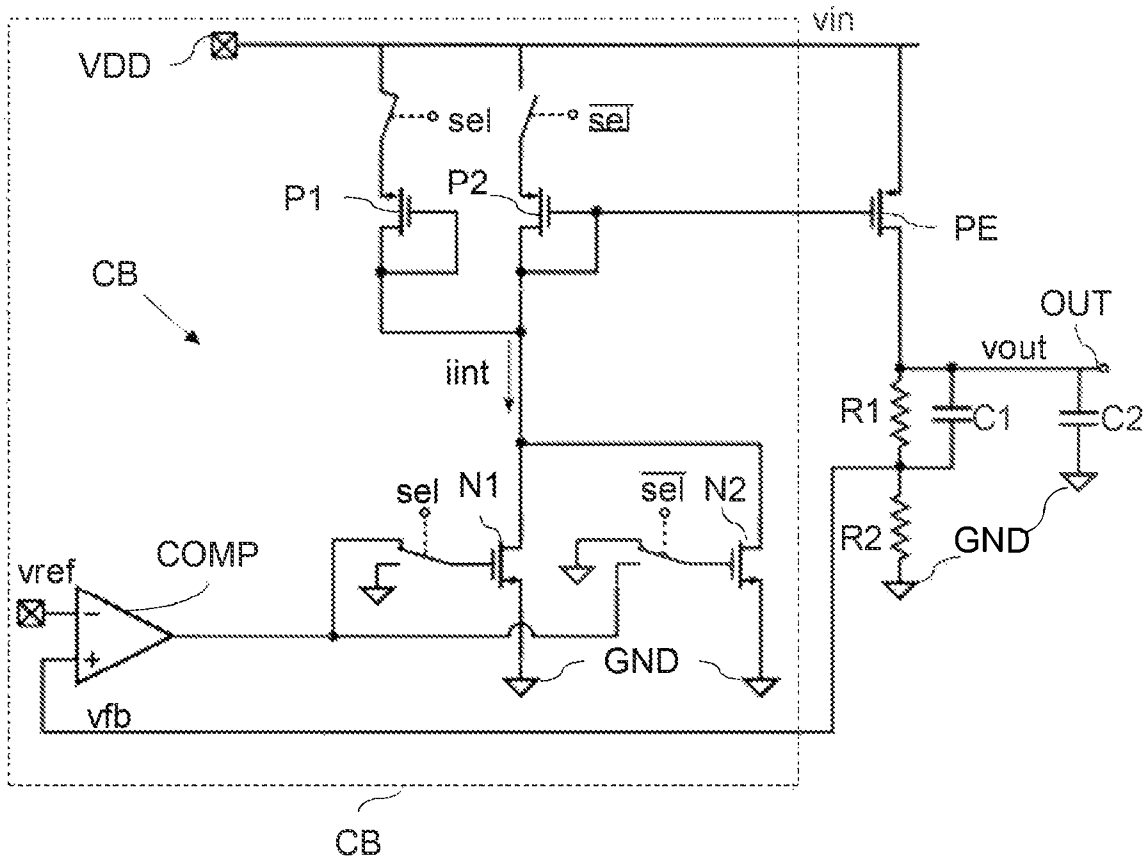
FIGS. 3 to 7 show block diagrams of further example implementations of low-dropout regulator circuits.

Referring now to FIG. 3, in the output part, respectively in the feedback part, the LDO circuit comprises a capacitance C1 connected in parallel to resistance R1, which is optional but can help to improve the system performance if the resistive divider R1, R2 is high ohmic. In such a case capacitance C1 provides a fast path for changes in the output voltage vout. Capacitance C2, connected between the output terminal OUT and the reference potential terminal GND, can be seen as a kind of buffer capacitance for the output voltage vout. Also capacitance C2 is optional.

In the implementation of FIG. 3, the control block CB comprises a differential amplifier COMP with a first input for receiving the reference voltage vref, with a second input for receiving the feedback voltage vfb and with an output for providing an intermediate voltage depending on a difference between the reference voltage vref and the feedback voltage vfb. The first input may be an inverting input whereas the second input may be a non-inverting input.

The control block further comprises a first series connection of a first input mirror transistor P1 and a first steering transistor N1 coupled between the supply terminal VDD and the reference potential terminal GND, as well as a second series connection of a second input mirror transistor P2 and a second steering transistor N2 coupled between the supply terminal VDD and the reference potential terminal GND. Gate terminals of the first and the second input mirror transistors P1, P2 are commonly coupled to a control input respectively gate terminal of the pass element PE. Hence, the pass element PE corresponds to an output mirror transistor of the respective current mirrors P1, PE, respectively P2, PE. The steering transistors N1, N2 are e.g. connected in a common-source configuration.

The first input mirror transistor P1 has a larger W/L ratio than the second input mirror transistor P2. Furthermore, the first steering transistor N1 has a smaller W/L ratio than the second steering transistor N2. The W/L ratio may be a measure for the current carrying capability of the transistors. For example, each of the input mirror transistors P1, P2 has its source terminal connected via a respective switch to the supply terminal VDD. For example, in the depicted implementation the two switches are operated with respective inverted versions of the selection signal sel, such that only one of the switches is closed while the other is open. The gate and drain terminals of the input mirror transistors P1, P2 are commonly connected to the drain terminals of the steering transistors N1, N2 and, as mentioned above, to the gate terminal of the pass element PE.

During the normal mode of operation the first series connection, including transistors P1, N1, is connected to the supply terminal VDD, e.g. by closing the switch at the source terminal of input mirror transistor P1. Furthermore, a gate terminal of the first steering transistor N1 is connected to the output of the differential amplifier COMP, e.g. by the corresponding switch at the gate terminal of N1, while a gate terminal of the second steering transistor N2 is connected to the reference potential terminal GND, e.g. by a corresponding further switch at the gate terminal of N2.

During the low-supply mode of operation the second series connection including transistors P2, N2 is connected to the supply terminal VDD, e.g. via the respective switch at the source terminal of transistor P2. Furthermore, the first series connection is disconnected from the supply terminal VDD, e.g. by opening the respective switch at the source terminal of transistor P1. The gate terminal of the second steering transistor N2 is connected to the output of the differential amplifier COMP, e.g. via the respective switch.

Due to the defined W/L ratios, during the low supply mode a smaller input mirror transistor P2 is enabled, such that the pullup of the gate terminal of the pass element PE is weaker. The bigger input mirror transistor P1, which is used during the normal mode of operation, is disabled.

During the normal mode of operation, the bigger input mirror transistor P1 is enabled. During the normal mode of operation, the smaller input mirror transistor P2 can either be disabled by opening the connection to the supply terminal VDD, or can stay fixedly connected to the supply terminal VDD such that the first and the second input mirror transistor P1, P2 operate in parallel and both contribute to controlling the current flow from the gate terminal of the pass element PE towards the reference potential terminal GND.

As to the steering transistors N1, N2, during the low-supply mode of operation the second steering transistor N2, with the larger W/L ratio, is enabled by connecting its gate terminal to the output of the differential amplifier COMP, such that the pulldown of the gate terminal of the pass element PE is stronger. The smaller steering transistor N1, which is used during the normal mode of operation, may be disabled by connecting its gate terminal to the reference potential terminal GND. However, in some implementations the smaller steering transistor N1 may be kept connected to the output of the differential amplifier COMP such that both the first and the second steering transistor N1, N2 contribute to the current draw towards the reference potential terminal GND.

During the normal mode of operation, the second steering transistor N2 is disabled.

The two current paths with the transistors of the defined W/L ratios implement a strong pulldown of the gate terminal of the pass element PE in the low-supply mode of operation, e.g. by making the N-side stronger and the P-side weaker, such that the current from the gate terminal of pass element PE towards GND is increased and the loop keeps regulating. Hence, in the low-supply mode of operation a lower resistance of the pass element PE can be achieved compared to the normal mode of operation, resulting in a minimum voltage drop between source and drain of the pass element PE, which allows the supply voltage vin to be very close to the target output voltage vt, or even go down to the target output voltage vt.

In summary, the respective smaller transistors, i.e. input mirror transistor P2 and steering transistor N1 may either be operated complementary to their counterpart or just left operational in any case. Hence, in some implementations during the normal mode of operation the second series connection is disconnected from the supply terminal and during the low-supply mode of operation the gate terminal of the first steering transistor is connected to the reference potential terminal GND. In alternative configurations, during the normal mode of operation the second series connection is connected to the supply terminal VDD and during the low-supply mode of operation the gate terminal of the first steering transistor N1 is connected to the output of the differential amplifier COMP.

Figure 4:
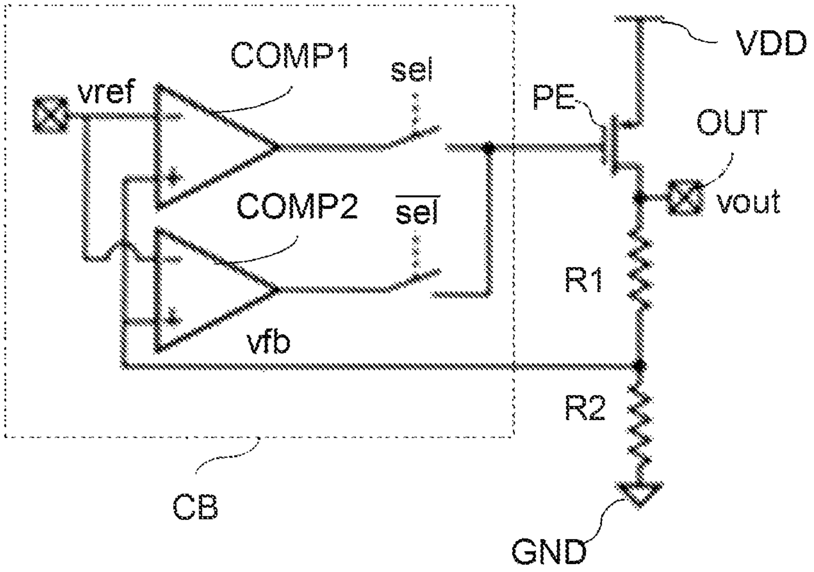

FIG. 4 shows a block diagram of a further example implementation of a low dropout regulator circuit that is based on the implementation shown in FIG. 1. In this implementation the control block CB comprises a first and a second differential amplifier COMP1, COMP2, each with a first input for receiving the reference vref and with a second input for receiving a feedback voltage vfb. For example, the respective first inputs of the differential amplifiers COMP1, COMP2 are inverting inputs, while the second inputs are non-inverting inputs.

Each of the differential amplifiers COMP1, COMP2 further includes an output for providing a respective intermediate voltage depending on a difference between the reference voltage vref and the feedback voltage vfb, i.e. the first differential amplifier provides a first intermediate voltage and the second differential amplifier COMP2 provides a second intermediate voltage.

The first differential amplifier COMP1 is designed for the normal mode of operation, while the second differential amplifier COMP2 is designed for the low-supply mode of operation. During the normal mode of operation, the first intermediate voltage is provided to the control input of the pass element PE, i.e. its gate terminal. During the low-supply mode of operation the second intermediate voltage is provided to the control input of the pass element PE.

The provision of the respective intermediate voltage is accomplished e.g. via respective switches connecting the outputs of the differential amplifiers COMP1, COMP2 to the gate terminal of the pass element PE. The two switches are operated with complementary versions of the selection signal sel.

For example, the first differential amplifier COMP1 is optimized for the normal mode of operation, and the second differential amplifier COMP2 is optimized to close the pass element PE as much as possible, in particular even for small differences between the reference voltage vref and the feedback voltage vfb. The specific optimization for the respective mode of operation of the two differential amplifiers COMP1, COMP2 is, for example, accomplished by dimensioning the second differential amplifier COMP2 stronger to the N-side such that lower control voltages at the gate terminal of the pass element PE can be achieved and consequently a higher current flow from the gate terminal towards the reference potential terminal GND can be affected.

In addition, the first differential amplifier COMP1 may be dimensioned stronger to the P-side such that a desired voltage drop along the pass element PE for higher supply voltages vin can be achieved more easily.

Figure 5:
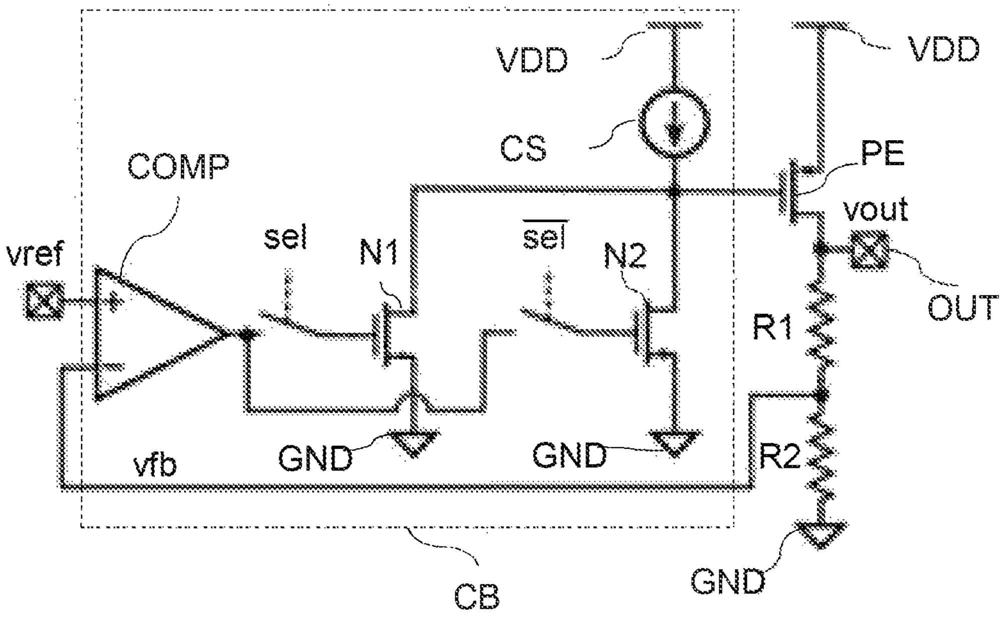

FIG. 5 shows a block diagram of another example implementation of an LDO circuit being based on the implementation shown in FIG. 1. In this example implementation the control block comprises a differential amplifier COMP with a first input, e.g. a non-inverting input, for receiving the reference voltage vref, with a second input, e.g. an inverting input, for receiving the feedback voltage vfb and with an output for providing an intermediate voltage depending on a difference between the reference voltage vref and the feedback voltage vfb.

A current source CS is connected between the supply terminal VDD and the control input of the pass element PE. A first steering transistor N1 is connected between the control input of the pass element PE and the reference potential terminal GND and has its gate terminal coupled to the output of the differential amplifier COMP. Similarly, a second steering transistor N2 is connected between the control input of the pass element PE and the reference potential terminal GND and has its gate terminal coupled to the output of the differential amplifier COMP. The second steering transistor N2 has a larger W/L ratio than the first steering transistor N1. For example, the steering transistors N1, N2 are coupled to the output of the differential amplifier COMP via respective switches that may be controlled with complementary versions of the selection signal sel.

During the normal mode of operation the gate terminal of the first steering transistor N1 is connected to the output of the differential amplifier and the gate terminal of the second steering transistor N2 is connected to the reference potential terminal GND. During the low-supply mode of operation the gate terminal of the second steering transistor N2 is connected to the output of the differential amplifier COMP.

Hence, during the low-supply mode of operation, the stronger second steering transistor N2 allows a higher current to flow from the common connection of the gate terminal of the pass element PE with the drain terminals of the steering transistors N1, N2 to the reference potential terminal GND for a nominally same difference between the reference voltage vref and the feedback voltage vfb. Hence, a higher voltage drop along the second steering transistor N2 can be achieved, resulting in a lower potential at the gate terminal of the pass element PE such that the channel resistance of the pass element PE can be minimized.

During the normal mode of operation, regulation via the weaker, first steering transistor N1 is sufficient for controlling the pass element PE, in particular the resistance of the pass element PE for higher supply voltages vin. Preferably, during the low-supply mode of operation the gate terminal of the first steering transistor N1 is connected to the reference potential terminal GND. However, in some alternative implementations, the gate terminal of the first steering transistor N1 may also be fixedly or switchably connected to the output of the differential amplifier COMP and hence contributes to the current flow from the gate terminal of the pass element PE towards the reference potential terminal. Hence, while the connection between the gate terminal of the second steering transistor N2 to the output of the differential amplifier COMP is switchable depending on the selection signal, the gate terminal of the first steering transistor N1 may be coupled to the output of the differential amplifier COMP either directly or via a switch controlled based on the selection signal, in particular complementary to the switch at the second steering transistor N2.

Figure 6:
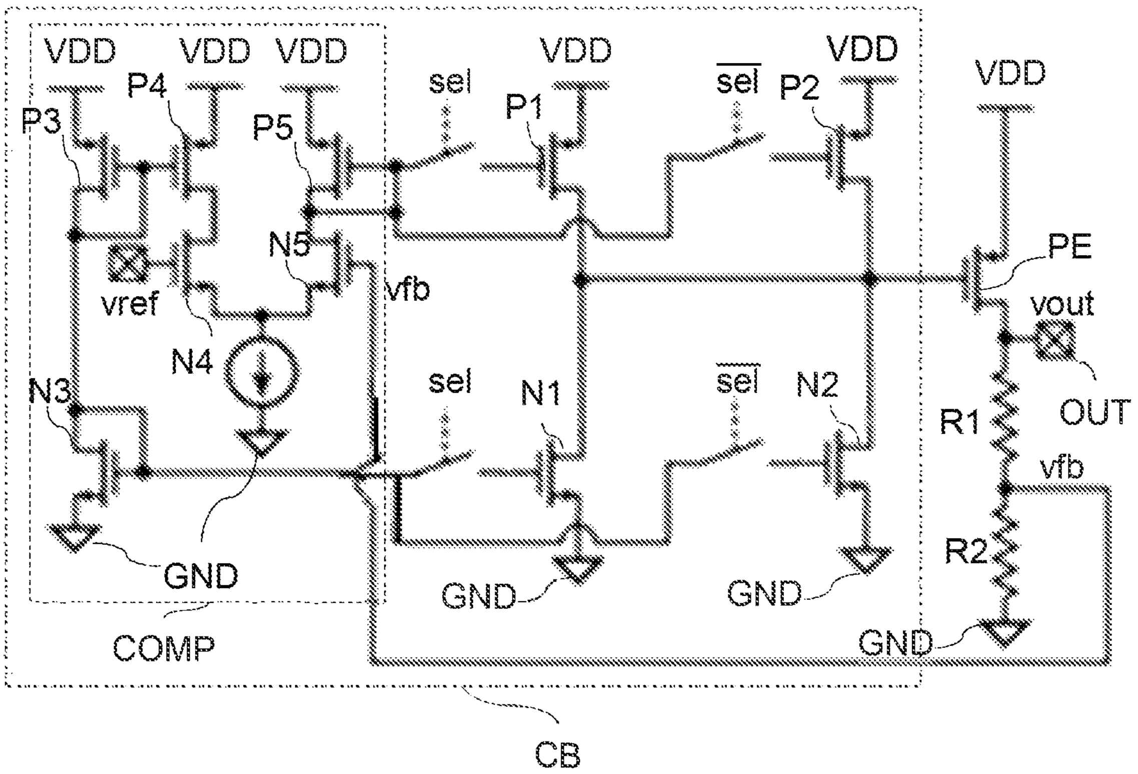

FIG. 6 shows a block diagram of another example implementation of an LDO circuit based on the implementation of FIG. 1. In this implementation, the control block CB comprises a first series connection of a first mirror transistor P1 and a first steering transistor N1 coupled between the supply terminal VDD and the reference potential terminal GND, as well as a second series connection of a second mirror transistor P2 and a second steering transistor N2 coupled between the supply terminal VDD and the reference potential terminal GND. The drain terminals of P1 and N1 as well as the drain terminals of P2 and N2 are commonly connected to a control input (i.e., gate terminal) of the pass element PE. The first mirror transistor P1 is stronger than the second mirror transistor P2. The first steering transistor N1 is weaker than the second steering transistor N2.

The control block further comprises a differential amplifier COMP with a first input for receiving the reference voltage vref, with a second input for receiving the feedback voltage vfb and with an output for providing an intermediate voltage depending on the difference between the reference voltage vref and the feedback voltage vfb. For example, without excluding other implementations of the differential amplifier COMP, the differential amplifier COMP comprises a third series connection of a third mirror transistor P3 and a third steering transistor N3 coupled between the supply terminal VDD and the reference potential terminal GND.

Both the third mirror transistor P3 and the third steering transistor N3 have their drain terminal connected to their gate terminal.

The differential amplifier COMP further comprises two differential branches having a common tail current source connected to the reference potential terminal GND. A first one of the differential branches includes a P-FET P4 in series with an N-FET N4, wherein the gate terminal of the P-FET P4 is connected to the gate terminal of the third mirror transistor P3, and the gate terminal of N-FET N4 is provided with the reference voltage vref. The second one of the differential branches comprises a series connection of a P-FET P5 with an N-FET N5, wherein a gate terminal of the P-FET P5 is connected to its drain terminal, respectively the drain terminal of N-FET N5, and the gate terminal of N-FET N5 is provided with the feedback voltage vfb. The output of the differential amplifier COMP is formed by the common connection of the drain terminals of P-FET P5 and N-FET N5, respectively the gate terminal of P-FET P5. The gate terminals of the first and the second mirror transistor P1, P2 are each switchably connected to this output of the differential amplifier COMP, e.g. controlled by respective complementary versions of the selection signal sel. Similarly, the gate terminals of the first and the second steering transistors N1, N2 are each switchably connected to the gate terminal of the third steering transistor N3, e.g. also controlled by respective complementary versions of the selection signal sel.

During the normal mode of operation a gate terminal of the first mirror transistor P1 is connected to the output of the differential amplifier COMP, a gate terminal of the first steering transistor N1 is connected to a bias connection of the differential amplifier, which is implemented by the gate terminal of transistor N3, and a gate terminal of the second steering transistor N2 is connected to the reference potential terminal GND. During the low-supply mode of operation a gate terminal of the second mirror transistor P2 is connected to the output of the differential amplifier COMP, the gate terminal of the first steering transistor N1 is connected to the reference potential terminal GND and the gate terminal of the second steering transistor N2 is connected to the bias connection of the differential amplifier COMP.

Hence, similarly to the previously described implementations, the stronger second steering transistor N2 allows a higher current flow from the common connection of the gate terminal of the pass element PE with the drain terminals of the steering transistors N1, N2 towards the reference potential terminal GND, thus a higher voltage drop along the second steering transistor N2, which allows a channel resistance of the pass element PE to be minimized even for small differences between the feedback voltage vfb and the reference voltage vref.

On the other hand, in the normal mode of operation the stronger first mirror transistor P1 allows an optimized control of the pass element PE, respectively the resistance of the pass element PE to achieve a good regulation even for higher supply voltages vin.

Similar to the previously described implementations, the respective weaker transistors, i.e. the first steering transistor N1 and the second mirror transistor P2, may be switched in a complementary way than the other steering transistor, respectively mirror transistor, such that either the stronger or the weaker transistor is active depending on the mode of operation. As an alternative, the weaker transistors may remain active in both modes of operation, such that the respective switch may be dispensed of and the weaker transistor works in parallel with the stronger transistor, depending on the mode of operation.

Figure 7:
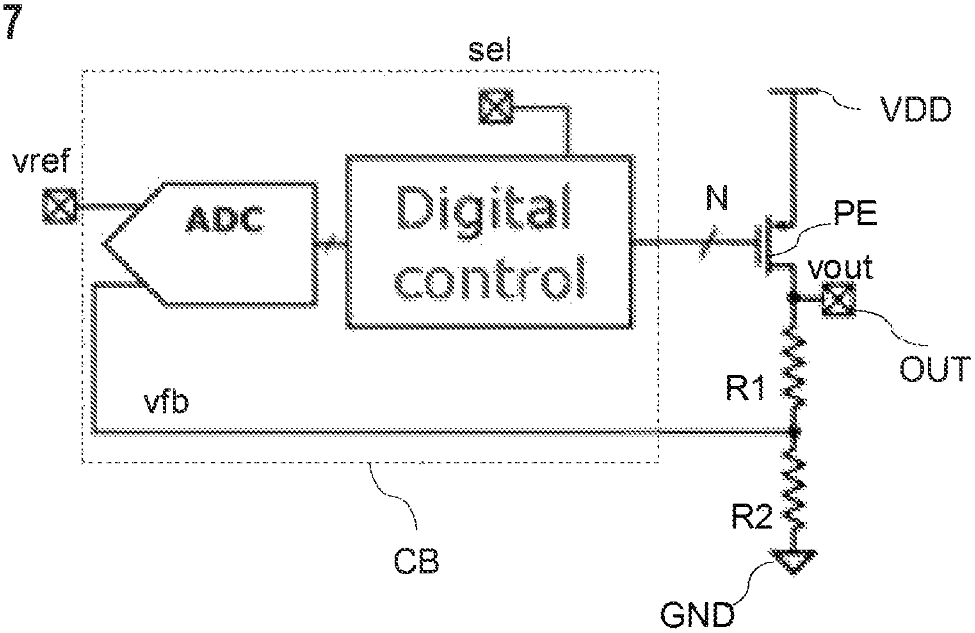

FIG. 7 shows a block diagram of a further example implementation of an LDO circuit based on the implementation of FIG. 1. In this example implementation a digital control is accomplished. To this end, the pass element PE comprises N parallel connected pass transistors, wherein each of the N pass transistors is controlled by a dedicated bit of a control word of length N provided by the digitally implemented control block CB. The control block CB comprises a differential analog-digital converter ADC with a first input for receiving the reference voltage vref, with a second input for receiving the feedback voltage vfb and with an output for providing a digital difference signal depending on the difference between the reference voltage vref and the feedback voltage vfb. The control block CB further comprises a digital control block configured to generate the N-bit control word based on the digital difference signal. The differential analog-digital converter ADC may have a resolution of equal to 1 bit or larger than 1 bit.

During the low-supply mode of operation the digital control block is initialized with a higher valued control word than during the normal mode of operation. Hence, a higher number of the N parallel connected pass transistors is activated, resulting in a higher current through the pass element PE in total, corresponding to a lower resistance, in particular compared to the normal mode of operation.

Figure 8:
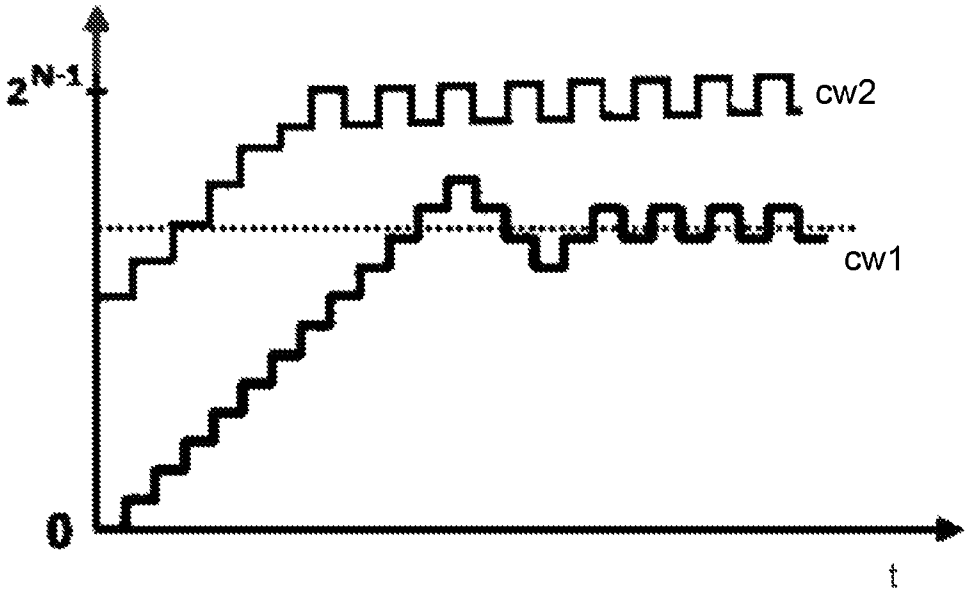
FIG. 8 shows an example diagram of digital control words.
Figure 9:
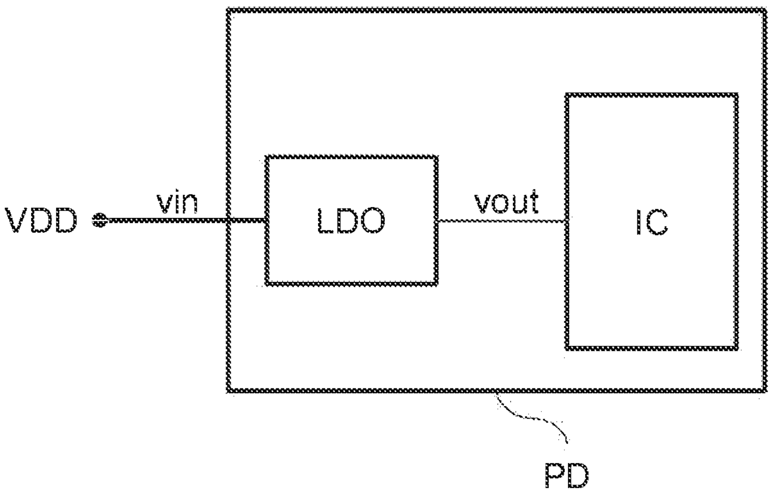
FIG. 9 shows an example implementation of an electronic device with a low-dropout regulator circuit.

Referring briefly to FIG. 8, an example diagram of digital control words that may be employed in the implementation of FIG. 7 is shown. For example, the control word "cw1" corresponds to the transient behavior of the control word output by the digital control block during the normal mode of operation, starting at a zero value in this example. On the other hand, control word "cw2", which may be employed during the low-supply mode of operation, starts with an offset, such that an initial higher current flow, respectively an initial lower resistance of the pass element PE can be achieved, which further evolves to a resulting control word over time to achieve the desired low resistance in the low-supply mode of operation. Generally speaking, the starting value or initial value of the control word in the low-supply mode of operation is higher than in the normal mode of operation. Referring now to FIG. 9, an example implementation of an electronic device with an LDO circuit for supplying the electronic device PD is shown. For example, the electronic device PD includes an LDO circuit according to one of the implementations described above, which receives the supply voltage vin at the supply terminal VDD and provides the output voltage vout to an integrated circuit IC of the electronic device PD. For example, the electronic device is at least one of a cellular communication device, a GNSS positioning device, a short-range radio frequency positioning device such as those based on Bluetooth low energy or ultra-wideband signals, or any kind of IoT device. Other implementations or applications of electronic devices employing an LDO circuit according to the improved supply concept should not be excluded by these examples.

Various embodiments of the improved supply concept can be implemented in the form of logic in software or hardware or a combination of both. The logic may be stored in a computer readable or machine-readable storage medium as a set of instructions adapted to direct one or more processors to perform a set of steps disclosed in embodiments of the improved supply concept. The logic may form part of a computer program product.

The specification and drawings are, accordingly, to be regarded in an illustrative rather than a restrictive sense. However, it will be evident that various modifications and changes may be made thereunto without departing from the scope of the invention as set forth in the claims.

LIST OF REFERENCE SIGNS

VDD supply terminal
GND reference potential terminal
OUT output terminal
PE pass element
CB control block
DET voltage detector
vin supply voltage
vout output voltage
vfb feedback voltage
vref reference voltage
sel selection signal
vt target output voltage
OR1, OR2 operating range
LR range
R1, R2, R3 resistance
C1, C2 capacitance
COMP, COMP1, COMP2 differential amplifier
CS current source
P1, P2, P3, P4, P5 P-FET
N1, N2, N3, N4, N5 N-FET
cw1, cw2 control word
LDO low-dropout regulator circuit
IC integrated circuit
PD electronic device

The invention claimed is:

1. A low-dropout regulator circuit comprising:

a supply terminal for receiving a supply voltage;

an output terminal for providing an output voltage;

a pass element coupled between the supply terminal and the output terminal; and a control block configured to control the pass element based on a difference between a feedback voltage which is derived from the output voltage, and a reference voltage, which determines a target output voltage;

wherein:

the control block is configured to be selectively operated in a normal mode of operation and in a low-supply mode of operation depending on a selection signal;

in the normal mode of operation the control block is configured to be operated with a first operating range for the supply voltage, the first operating range excluding the target output voltage; and in the low-supply mode of operation the control block is configured to be operated with a second operating range for the supply voltage, the second operating range including the target output voltage and only partially overlapping with the first operating range, wherein the control block comprises:

a differential amplifier having a first input for receiving the reference voltage, having a second input for receiving the feedback voltage and having an output for providing an intermediate voltage depending on a difference between the reference voltage and the feedback voltage;

a first series connection of a first input mirror transistor and a first steering transistor coupled between the supply terminal and a reference potential terminal;

a second series connection of a second input mirror transistor and a second steering transistor coupled between the supply terminal and the reference potential terminal; wherein gate terminals of the first and the second input mirror transistor are commonly coupled to a control input of the pass element;

the first input mirror transistor has a larger W/L ratio than the second input mirror transistor;

the first steering transistor has a smaller W/L ratio than the second steering transistor;

and wherein the low-dropout regulator is operable such that:

during the normal mode of operation the first series connection is connected to the supply terminal, a gate terminal of the first steering transistor is connected to the output of the differential amplifier, and a gate terminal of the second steering transistor is connected to the reference potential terminal; and during the low-supply mode of operation the second series connection is connected to the supply terminal, the first series connection is disconnected from the supply terminal, and the gate terminal of the second steering transistor is connected to the output of the differential amplifier.

2. The low-dropout regulator circuit according to claim 1, wherein:

in the normal mode of operation the control block is configured to control a resistance of the pass element to match a particular voltage drop between the supply terminal and the output terminal; and in the low-supply mode of operation the control block is configured to control a resistance of the pass element towards zero to achieve a minimum voltage drop between the supply terminal and the output terminal.

3. The low-dropout regulator circuit according to claim 1, wherein an accuracy of regulation of the control block, based on the supply voltage exceeding the second operating range, is higher in the normal mode of operation than in the low-supply mode of operation.

4. The low-dropout regulator circuit according to claim 1, wherein:

the target output voltage is in the range of 0.6 V to 1.1 V; and a lower limit of the first operating range is at least 0.1 V higher than the target output voltage.

5. The low-dropout regulator circuit according to claim 1, wherein the low-dropout regulator is operable such that:

during the normal mode of operation the second series connection is disconnected from the supply terminal; and during the low-supply mode of operation the gate terminal of the first steering transistor is connected to the reference potential terminal.

6. The low-dropout regulator circuit according to claim 1, wherein the low-dropout regulator is operable such that:

during the normal mode of operation the second series connection is connected to the supply terminal; and during the low-supply mode of operation the gate terminal of the first steering transistor is connected to the output of the differential amplifier.

7. The low-dropout regulator circuit according to claim 1, further comprising a voltage detector for generating the selection signal based on the supply voltage.

8. A low-dropout regulator circuit comprising:

a supply terminal for receiving a supply voltage;

an output terminal for providing an output voltage;

a pass element coupled between the supply terminal and the output terminal; and a control block configured to control the pass element based on a difference between a feedback voltage which is derived from the output voltage, and a reference voltage, which determines a target output voltage;

wherein:

the control block is configured to be selectively operated in a normal mode of operation and in a low-supply mode of operation depending on a selection signal;

in the normal mode of operation the control block is configured to be operated with a first operating range for the supply voltage, the first operating range excluding the target output voltage; and in the low-supply mode of operation the control block is configured to be operated with a second operating range for the supply voltage, the second operating range including the target output voltage and only partially overlapping with the first operating range, wherein the control block comprises:

a first differential amplifier having a first input for receiving the reference voltage, having a second input for receiving the feedback voltage and having an output for providing a first intermediate voltage depending on a difference between the reference voltage and the feedback voltage;

a second differential amplifier having a first input for receiving the reference voltage, having a second input for receiving the feedback voltage and having an output for providing a second intermediate voltage depending on a difference between the reference voltage and the feedback voltage; wherein:

the first differential amplifier is designed for the normal mode of operation;

the second differential amplifier is designed for the low-supply mode of operation;

wherein the low-dropout regulator is operable such that:

during the normal mode of operation the first intermediate voltage is provided to a control input of the pass element; and during the low-supply mode of operation the second intermediate voltage is provided to the control input of the pass element.

9. The low-dropout regulator circuit according to claim 8, wherein:

in the normal mode of operation the control block is configured to control a resistance of the pass element to match a particular voltage drop between the supply terminal and the output terminal; and in the low-supply mode of operation the control block is configured to control a resistance of the pass element towards zero to achieve a minimum voltage drop between the supply terminal and the output terminal.

10. The low-dropout regulator circuit according to claim 8, wherein an accuracy of regulation of the control block, based on the supply voltage exceeding the second operating range, is higher in the normal mode of operation than in the low-supply mode of operation.

11. The low-dropout regulator circuit according to claim 8, wherein:

the target output voltage is in the range of 0.6 V to 1.1 V; and a lower limit of the first operating range is at least 0.1 V higher than the target output voltage.

12. A low-dropout regulator circuit comprising:

a supply terminal for receiving a supply voltage;

an output terminal for providing an output voltage;

a pass element coupled between the supply terminal and the output terminal; and a control block configured to control the pass element based on a difference between a feedback voltage which is derived from the output voltage, and a reference voltage, which determines a target output voltage;

wherein:

the control block is configured to be selectively operated in a normal mode of operation and in a low-supply mode of operation depending on a selection signal;

in the normal mode of operation the control block is configured to be operated with a first operating range for the supply voltage, the first operating range excluding the target output voltage; and in the low-supply mode of operation the control block is configured to be operated with a second operating range for the supply voltage, the second operating range including the target output voltage and only partially overlapping with the first operating range, wherein the control block comprises:

a differential amplifier having a first input for receiving the reference voltage, having a second input for receiving the feedback voltage (vfb) and having an output for providing an intermediate voltage depending on a difference between the reference voltage and the feedback voltage;

a first series connection of a first mirror transistor and a first steering transistor coupled between the supply terminal and a reference potential terminal;

a second series connection of a second mirror transistor and a second steering transistor coupled between the supply terminal and the reference potential terminal; wherein:

a connection between the first mirror transistor and the first steering transistor and a connection between the second mirror transistor and the second steering transistor bare commonly connected to a control input of the pass element;

the first mirror transistor is stronger than the second mirror transistor;

the second steering transistor is stronger than the first steering transistor;

wherein the low-dropout regulator is operable such that:

during the normal mode of operation a gate terminal of the first mirror transistor is connected to the output of the differential amplifier, a gate terminal of the first steering transistor is connected to a bias connection of the differential amplifier, and a gate terminal of the second steering transistor is connected to the reference potential terminal; and during the low-supply mode of operation a gate terminal of the second mirror transistor is connected to the output of the differential amplifier, the gate terminal of the first steering transistor is connected to the reference potential terminal, and the gate terminal of the second steering transistor is connected to the bias connection of the differential amplifier.

13. The low-dropout regulator circuit according to claim 12, wherein:

in the normal mode of operation the control block is configured to control a resistance of the pass element to match a particular voltage drop between the supply terminal and the output terminal; and in the low-supply mode of operation the control block is configured to control a resistance of the pass element towards zero to achieve a minimum voltage drop between the supply terminal and the output terminal.

14. The low-dropout regulator circuit according to claim 12, wherein an accuracy of regulation of the control block, based on the supply voltage exceeding the second operating range, is higher in the normal mode of operation than in the low-supply mode of operation.

15. The low-dropout regulator circuit according to claim 12, wherein:

the target output voltage is in the range of 0.6 V to 1.1 V; and a lower limit of the first operating range is at least 0.1 V higher than the target output voltage.

* * * * *